United States Patent
Morifusa

(10) Patent No.: US 7,893,139 B2
(45) Date of Patent: Feb. 22, 2011

(54) MODIFIED ASPHALT AND TWO-COMPONENT RESIN COMPOSITION

(75) Inventor: Harumi Morifusa, Yasu (JP)

(73) Assignee: Chugoku Marine Paints, Ltd., Ohtake-shi (JP)

( * ) Notice: Subject to any disclaimer, the term of this patent is extended or adjusted under 35 U.S.C. 154(b) by 0 days.

(21) Appl. No.: 12/540,044

(22) Filed: Aug. 12, 2009

(65) Prior Publication Data

US 2010/0056674 A1  Mar. 4, 2010

(30) Foreign Application Priority Data

Sep. 4, 2008  (JP) .............................. 2008-226853

(51) Int. Cl.
 *C08L 95/00* (2006.01)
(52) U.S. Cl. ....................................................... 524/71
(58) Field of Classification Search .................... 524/71
 See application file for complete search history.

(56) References Cited

U.S. PATENT DOCUMENTS 4,902,349 A   2/1990  Wakizaka et al.
5,360,848 A * 11/1994  Kuechler et al. .............. 524/59

FOREIGN PATENT DOCUMENTS

| JP | 61-152764 | 7/1986 |
|---|---|---|
| JP | 62-218448 | 9/1987 |
| JP | 1-40866 | 8/1989 |
| JP | 1-40871 | 8/1989 |
| JP | 7-118541 | 5/1995 |
| JP | 2000-239527 | 9/2000 |
| JP | 2002-20626 | 1/2002 |
| JP | 2006-143954 | 6/2006 |

* cited by examiner

*Primary Examiner*—Peter Szekely
(74) *Attorney, Agent, or Firm*—Oblon, Spivak, McClelland, Maier & Neustadt, L.L.P.

(57) ABSTRACT

Modified asphalts have excellent dispersibility and compatibility with polar materials, are usable in applications including railroad track-filling materials, and are inexpensive.

A modified asphalt includes an asphalt (A), a viscosity depressant (B) and a copolymer (C) containing a structural unit from a polyalkylene glycol allyl ether (c1), a structural unit from an unsaturated dicarboxylic acid and/or an acid anhydride thereof (c2), and a structural unit from an aromatic vinyl compound (c3).

16 Claims, 1 Drawing Sheet

[Fig.1]
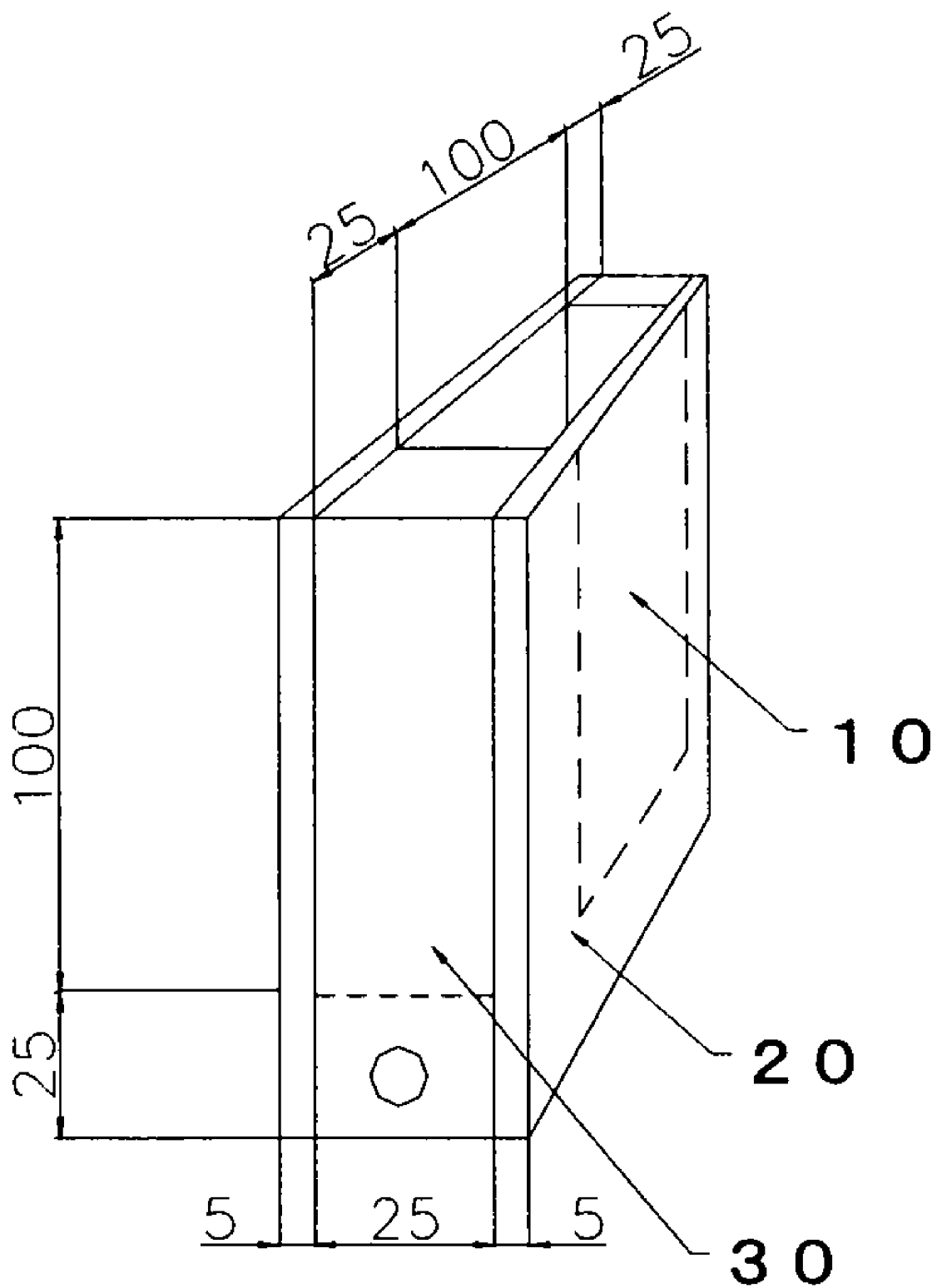

MODIFIED ASPHALT AND TWO-COMPONENT RESIN COMPOSITION

FIELD OF THE INVENTION

The present invention relates to modified asphalts and two-component resin compositions.

BACKGROUND OF THE INVENTION

Petroleum asphalts are widely used in road pavement materials, emulsions, vibration damping materials and the like. According to statistical data on demand and supply of petroleum asphalts in a journal from The Japan Asphalt Association and according to a petroleum statistical estimate by the Japanese Ministry of Economy, Trade and Industry (the former Ministry of International Trade and Industry), the demand and supply of petroleum asphalts in Japan were balanced both at more than 6,000,000 tons until around 1998. However, the demand and supply have both decreased below 6,000,000 tons since around 2000, and the data has shown an oversupply trend. In 2007, the supply stood at a little over 5,000,000 tons whereas the demand showed a sharp decline to slightly more than 3,000,000 tons. Thus, excess supply is increasing.

The excess supply is expected to continue. With soaring prices of petroleum products these days, it is demanded that the applications of petroleum asphalts be increased. Of the petroleum asphalts, straight asphalts are stably inexpensive materials. According to prices of construction material and wages by Construction Research Institute Japan, the straight asphalts are traded in the market at approximately 60,000 yen per tank truck load (approximately 6 yen per kg), and the freight costs as little as the materials. The straight asphalts are quite inexpensive materials.

The straight asphalts are composed of malthene (petrolene) that is soluble in normal pentane, and asphaltene that is insoluble in normal pentane. The malthene has a resin component and an oil component. It is assumed that the straight asphalt has a structure in which asphaltene coated with the malthene resin component is colloidally suspended in the malthene oil component. Although the exact chemical structure of the straight asphalt is not established yet because it is a natural material (a high-boiling fraction obtained in petroleum refining), the chemical composition is assumed to be a complex of the various aliphatic hydrocarbon compounds.

The straight asphalt is generally solid at normal temperature. The straight asphalt is used as road pavement materials, mixtures, emulsions, vibration damping materials and the like (Patent Document 1). However, the cured products have poor storage stability, heat resistance, water resistance, and mechanical strength such as hardness.

With respect to these problems, it is proposed that modifiers are used to improve the above properties of the straight asphalts. Known modifiers for drainage pavement asphalts include graft-modified polymers of ethylene/vinyl acetate copolymer, ethylene/acrylic acid copolymer or ethylene/conjugated diene copolymer with an unsaturated dicarboxylic acid; graft-modified polymers of polyethylene or polypropylene with an unsaturated dicarboxylic acid; polymer alloy compounds such as block copolymers obtained by IPN (interpenetrating polymer network) methods; and styrene/conjugated diene copolymers (Patent Documents 1 to 4).

Patent Document 5 describes a modified asphalt mixture obtained by mixing a straight asphalt with a reactive solvent that contains a bisphenol A epoxy resin and a modified aliphatic amine which both have compatibility with the asphalt. It is described that the viscosity increase is excellently prevented in the production and placement processes and the mixture can give pavements with a desired strength.

However, the modified straight asphalts obtained with the above modifiers have poor storage stability over long periods.

It is also known that straight asphalts are modified with epoxy resins or urethane resins. However, the straight asphalts are non-polar materials and show bad compatibility with polar materials such as epoxy resins and urethane resins, resulting in separation. Thus, homogeneous and rigid cured products cannot be obtained. This problem is due to the fact that the straight asphalt is a complex of the various aliphatic hydrocarbon compounds and is a non-polar material with no molecular charges, similar to water and oil being immiscible with each other.

As described above, it is difficult that the straight asphalts are used in general chemical products ranging widely from adhesives and coating materials to floor materials and waterproof materials that contain general synthetic polar resins such as urethane resins or epoxy resins. Thus, the applications of the straight asphalts are limited to composites and emulsions as road pavement materials.

To address these problems, asphalt/polyol emulsions are obtained by mixing and emulsifying an asphalt, a polyol, a surfactant having HLB of about 13 to 18, and a plasticizer. Such modified asphalts are improved in compatibility with polar materials (Patent Document 6). The patent document describes that with the improved compatibility between asphalt and polyol, the asphalt/polyol emulsion together with a reacting agent such as an isocyanate can give urethane asphalts used as waterproof materials, floor materials and other various industrial materials.

Patent Document 1: JP-A-2000-239527
Patent Document 2: JP-A-S61-152764
Patent Document 3: JP-A-2002-020626
Patent Document 4: JP-A-2006-143954
Patent Document 5: JP-A-H07-118541
Patent Document 6: JP-A-S62-218448

SUMMARY OF THE INVENTION

The surfactant in the asphalt/polyol emulsions disclosed in Patent Document 6 has high HLB. Accordingly, the compatibility between asphalt and high-HLB surfactant is considered to be low, and it is therefore assumed that the asphalt is forcibly emulsified into a paste asphalt.

In detail, it is assumed that the technology according to Patent Document 6 does not improve the compatibility between asphalt and polyol, but the forced emulsification disperses the asphalt as particles in the polyol and makes less likely the separation of the asphalt from the polyol.

As described hereinabove, the asphalt is a non-polar material and shows low compatibility with materials other than olefin resins, resulting in separation. Although the asphalt can be dissolved in process oils or plasticizers by heating, it cannot be used in compositions containing polar materials.

JP-B-H01-40866 and JP-B-H01-40871 disclose, as asphalt alternatives, slab track-filling compositions and track structure-filling compositions that contain aromatic group-containing process oil polymers. The aromatic group-containing process oil polymers are obtained by cyclopolymerization of aromatic group-containing process oils, and this makes the compositions more than fifteen times as expensive as the straight asphalts. Further, obtaining the aromatic group-containing process oil polymers entails chemical reaction pathway.

Hence, economic disadvantages are caused in blending synthetic materials such as the aromatic group-containing process oil polymers into the slab track-filling compositions. Accordingly, inexpensive materials such as straight asphalts are desired.

It is an object of the invention to provide inexpensive modified asphalts that have excellent compatibility with polar materials such as polyols, epoxy resins and urethane resins and are usable in applications such as railroad track-filling materials, adhesives, coating materials, floor materials and waterproof materials.

It is another object of the invention to provide two-component resin compositions containing a main component and a curing agent that are inexpensive and can give cured products having excellent storage stability and mechanical strength such as hardness.

As described hereinabove, the dispersibility and compatibility of asphalts with general polar synthetic resins should be improved in order that the asphalts may be blended with polar synthetic resins such as polyols, epoxy resins and urethane resins.

The present inventor diligently studied the conventional surfactants. They have then found that copolymers having specific structural units show superior compatibility with asphalts (non-polar materials) such as straight asphalts and blown asphalts and very high compatibility with polyols (polar materials) such as polyether polyols.

The use of the copolymers as surfactants enhances the dispersibility and compatibility of non-polar materials such as straight asphalts and blown asphalts with respect to polar materials such as polyfunctional polyether polyols having a high hydroxyl value (OHV).

The present invention is concerned with the following [1] to [16].

[1] A modified asphalt comprising an asphalt (A), a viscosity depressant (B) and a copolymer (C) comprising a structural unit from a polyalkylene glycol allyl ether (c1), a structural unit from an unsaturated dicarboxylic acid and/or an acid anhydride thereof (c2), and a structural unit from an aromatic vinyl compound (c3).

[2] The modified asphalt described in [1], wherein the asphalt (A) is a straight asphalt (A1) according to JIS K 2207.

[3] The modified asphalt described in [1], wherein the asphalt (A) is a blown asphalt (A2) according to JIS K 2207.

[4] The modified asphalt described in any one of [1] to [3], wherein the viscosity depressant (B) is a process oil.

[5] A two-component resin composition comprising a main component and a curing agent, the main component comprising an asphalt (A), a viscosity depressant (B), a copolymer (C) comprising a structural unit from a polyalkylene glycol allyl ether (c1), a structural unit from an unsaturated dicarboxylic acid and/or an acid anhydride thereof (c2) and a structural unit from an aromatic vinyl compound (c3), a polyolefin polyol (D) and a polyether polyol (E), the curing agent comprising a diisocyanate (F).

[6] The two-component resin composition described in [5], wherein the asphalt (A) is a straight asphalt (A1) according to JIS K 2207.

[7] The two-component resin composition described in [5], wherein the asphalt (A) is a blown asphalt (A2) according to JIS K 2207.

[8] The two-component resin composition described in any one of [5] to [7], wherein the viscosity depressant (B) is a process oil.

[9] The two-component resin composition described in any one of [5] to [7], wherein the main component further comprises an extender pigment (G).

[10] The two-component resin composition described in [8], wherein the main component further comprises an extender pigment (G).

[11] The two-component resin composition described in [9], wherein the main component further comprises a synthetic zeolite (H).

[12] The two-component resin composition described in [10], wherein the main component further comprises a synthetic zeolite (H).

[13] The two-component resin composition described in any one of [5] to [7], which is a railroad track-filling material.

[14] The two-component resin composition described in [8], which is a railroad track-filling material.

[15] The two-component resin composition described in [9], which is a railroad track-filling material.

[16] The two-component resin composition described in any one of [10] to [12], which is a railroad track-filling material.

ADVANTAGEOUS EFFECTS OF THE INVENTION

The modified asphalts according to the present invention have excellent compatibility with polar materials such as polyols, epoxy resins and urethane resins and are usable in applications such as railroad track-filling materials, adhesives, coating materials, floor materials and waterproof materials. The modified asphalts also have high cost performance.

The two-component resin compositions with a main component and a curing agent according to the invention can give cured products that are inexpensive and have excellent storage stability and mechanical strength such as hardness. The cured products are suitably used as railroad track-filling materials, adhesives, coating materials, floor materials and waterproof materials, and in particular railroad track-filling materials.

BRIEF DESCRIPTION OF THE DRAWING

FIG. 1 is a perspective view of a high-density polyethylene mold container (inner volume: 100 mm×100 mm×25 mm) used in Examples and Comparative Examples, wherein:

10 . . . Inner volume of high-density polyethylene mold container (100 mm×100 mm×25 mm)

20 . . . High-density polyethylene plate (150 mm×125 mm×5 mm)

30 . . . High-density polyethylene square bar (25 mm square)

PREFERRED EMBODIMENTS FOR CARRYING OUT THE INVENTION

Hereinbelow, modified asphalts and two-component resin compositions comprising a main component and a curing agent according to the invention will be described in detail. They contain a specific copolymer (C) described later as a surfactant. The use of the copolymer (C) as a surfactant improves the dispersibility and compatibility of asphalts with general synthetic resins containing polar materials such as polyols, epoxy resins and urethane resins.

[Modified Asphalts]

The modified asphalts of the invention contain an asphalt (A), a viscosity depressant (B) and a copolymer (C). They may further contain various additives as required.

⟨Asphalts (A)⟩

Examples of the asphalts (A) include straight asphalts (A1) and blown asphalts (A2). In the invention, the straight asphalts and the blown asphalts refer to straight asphalts and blown asphalts according to JIS K 2207, "Petroleum asphalts".

The straight asphalts (A1) include straight asphalts 20-40, straight asphalts 40-60, straight asphalts 60-80 and straight asphalts 150-200 according to JIS K 2207.

As the straight asphalts (A1) have a smaller penetration (for example, 20 to 40), modified asphalts of the asphalts give cured products having a higher hardness. The hardness of the cured products decreases with increasing penetration (for example, 150 to 200).

When the mixing ratio of the straight asphalt (A1) and the viscosity depressant (B) is identical, the modified asphalts have a higher viscosity with decreasing penetration and a lower viscosity with increasing penetration. In view of hardness of cured products, straight asphalts 40-60 are particularly preferred as the straight asphalts (A1).

The blown asphalts (A2) include blown asphalts 10-20, blown asphalts 20-30 and blown asphalts 30-40 according to JIS K 2207.

The blown asphalts have been blown with air and been heated and oxidatively polymerized, and have a higher melting point than the straight asphalts. In view of applications of the modified asphalts described later and processability, blown asphalts with a low softening point such as blown asphalts 20-30 and blown asphalts 30-40 are preferable.

When the straight asphalt (A1) is used as the asphalt (A), the content of the straight asphalt (A1) in the modified asphalt is generally not more than 70 wt %, preferably not more than 65 wt %, and more preferably not more than 60 wt % in view of fluidity in blending the materials. The lower limit of the content of the asphalt (A1) is generally 25 wt %, and preferably 30 wt %.

When the blown asphalt (A2) is used as the asphalt (A), the content of the blown asphalt (A2) in the modified asphalt is generally not more than 55 wt %, preferably not more than 52 wt %, and more preferably not more than 50 wt % in view of fluidity in blending the materials. The lower limit of the content of the blown asphalt (A2) is generally 25 wt %, and preferably 30 wt %.

The content of the asphalt (A1) in the modified asphalt may be higher because the straight asphalts (A1) have a lower softening point and higher cost performance compared to the blown asphalts (A2). Thus, the viscosity of the modified asphalts may be controlled widely by using the straight asphalts (A1) as the asphalts (A).

⟨Viscosity Depressants (B)⟩

Examples of the viscosity depressants (B) include process oils; fatty acid esters; phosphates; epoxy esters; and plasticizers such as aromatic dibasic acid esters including dioctyl phthalate (DOP), diisodecyl phthalate (DIDP), diisononyl phthalate (DINP), diheptyl phthalate (DHP) and butylbenzyl phthalate (BBP), and aliphatic dibasic acid esters including dioctyl adipate (DOA), diisodecyl adipate (DIDA) and dioctyl sebacate (DOS). The aromatic dibasic acid esters and the aliphatic dibasic acid esters preferably have a boiling point and a flash point of not less than 200° C.

Examples of the viscosity depressants (B) further include derivatives of the above fatty acid esters, phosphates, epoxy esters, aromatic dibasic acid esters and aliphatic dibasic acid esters.

In particular, process oils are preferable in terms of costs. Paraffin process oils, naphthene process oils and aromatic process oils are commercially available. Of these, aromatic process oils having a low aniline point show high compatibility with polar materials having molecular polarity and provide cost advantages. The process oils are lubricating oils or solvents used in processing oils or extenders for natural rubbers or synthetic rubbers, plasticizers for thermoplastic resins, printing ink components, and asphalt softening agents.

When the straight asphalt (A1) is used as the asphalt (A), the content of the viscosity depressant (B) in the modified asphalt is generally not less than 20 wt %, preferably from 30 to 65 wt %, and more preferably 35 to 65 wt % in view of fluidity in blending the materials.

When the blown asphalt (A2) is used as the asphalt (A), the content of the viscosity depressant (B) in the modified asphalt is generally not less than 35 wt %, preferably from 40 to 65 wt %, and more preferably 45 to 65 wt % in view of fluidity in blending the materials.

⟨Copolymers (C)⟩

The copolymers (C) include a structural unit from a polyalkylene glycol allyl ether (c1), a structural unit from an unsaturated dicarboxylic acid and/or an acid anhydride thereof (c2), and a structural unit from an aromatic vinyl compound (c3).

With respect to the structural units from a polyalkylene glycol allyl ether (c1), the structural units from an unsaturated dicarboxylic acid and/or an acid anhydride thereof (c2) and the structural units from an aromatic vinyl compound (c3), the molar ratio is generally about 1:1:1. When the copolymer (C) has approximately this molar ratio of the structural units, the copolymer (C) shows excellent affinity for non-polar materials such as asphalts and polar materials such as polyether polyols as described later.

The copolymers (C) may contain other structural units while still achieving the objects of the invention. Such additional structural units include those derived from polymerizable unsaturated monomers such as α-olefins, isobutylene, vinyl acetate, allylsulfonic acid, acrylates, methacrylates, acrylamide and methacrylamide.

The structural units from an aromatic vinyl compound (c3) provide affinity for the asphalts (A). Further, the copolymers (C) have a polar group such as a carbonyl group (—CO—), an ether group (—C—O—C—) and an ester group (—CO—O—) and thereby shows affinity for polar materials, working as surfactants.

Thus, the copolymers (C) may be used as surfactants in the invention to improve the dispersibility and compatibility of the asphalts (A) with respect to polar materials such as polyfunctional polyether polyols having a high hydroxyl value (OHV).

Examples of the polyalkylene glycol allyl ethers (c1) include polyethylene glycol allyl ethers and polypropylene glycol allyl ethers. They may be used singly, or two or more kinds may be used in combination.

Polyalkylene glycol (meth)acrylates (c1') may be used in place of the polyalkylene glycol allyl ethers (c1).

Examples of the unsaturated dicarboxylic acids include maleic acid, fumaric acid and citraconic acid. Examples of the unsaturated dicarboxylic acid anhydrides include anhydrides of the above unsaturated dicarboxylic acids such as maleic anhydride, fumaric anhydride and citraconic anhydride. Of these, maleic anhydride is particularly preferable. They may be used singly, or two or more kinds may be used in combination.

Examples of the aromatic vinyl compounds (c3) include styrene, 1-methylstyrene, 2-methylstyrene, 3-methylstyrene, α-methylstyrene and vinylnaphthaline. Of these, styrene is particularly preferable. They may be used singly, or two or more kinds may be used in combination.

The modified asphalts may be used in two-component resin compositions as railroad track-filling materials described later. The compositions generally do not show water solubility. In view of this, preferred copolymers (C) are copolymers (1) that contain structural units from polypropylene glycol allyl ether, structural units from maleic anhydride and structural units from styrene, and copolymers (2) that contain structural units from polyethylene glycol allyl ether, structural units from maleic anhydride and structural units from styrene. The copolymers (1) are particularly preferred.

Examples of the copolymers (1) include MALIALIM AAB-0851 (product name, manufactured by NOF CORPORATION) Examples of the copolymers (2) include MALIALIM AKM-0531 (product name, manufactured by NOF CORPORATION).

For example, the copolymers (C) may be produced by copolymerizing by a known method a monomer mixture containing the polyalkylene glycol allyl ether (c1), the unsaturated dicarboxylic acid and/or acid anhydride thereof (c2), and the aromatic vinyl compound (c3).

The copolymers (C) generally have a weight average molecular weight in the range of 15,000 to 60,000 as measured by gel permeation chromatography relative to polystyrene standards.

The content of the copolymers (C) in the modified asphalt is generally 0.5 to 7 wt %, preferably 0.5 to 4 wt %, and more preferably 0.5 to 2 wt %. This content of the copolymers (C) ensures that the dispersibility and compatibility of the asphalts (A) with polar materials are enhanced. Copolymers having constitutions similar to the copolymers (C) are usually expensive and cannot be added in large amounts to asphalts. In contrast, the copolymers (C) in small amounts can modify the asphalts (A) and have superior cost performance.

If the content of the copolymers (C) exceeds the above range, the use of the obtainable modified asphalt in the two-component railroad track-filling resin composition results in a reaction molar ratio (NCO/OH index) in the crosslinking reaction described later that is outside the predetermined range, and the composition may not be cured sufficiently. If the content of the copolymers (C) is below the above range, the dispersibility and compatibility of the asphalts (A) with polar materials may not be improved sufficiently.

The copolymers (C) are suitable as surfactants for the following reasons. The solubility parameter (the SP value) of the asphalts (A) is assumed to range from 8 to 9. Herein, the SP value is an index of solubility. It is empirically known that the smaller the difference in SP values between two components, the higher the solubility (the higher the compatibility).

For example, the asphalts (A) show a certain level of compatibility with olefin resins (non-polar materials) such as polyethylene (SP value: 8.1), ethylene/vinyl acetate copolymer (SP value (approximately 20 wt % vinyl acetate-derived structural units): about 9.0), ethylene/ethyl acrylate copolymer (SP value (approximately 20 wt % ethyl acrylate-derived structural units): about 8.9) and polybutadiene (SP value: 8.5 (polybutadiene polyols have an SP value ranging from 9 to 10).

On the other hand, the asphalts (A) have very bad compatibility with high-SP synthetic resins such as epoxy resins (bisphenol epoxy resins have an SP value of 11) and urethane resins (polyfunctional high-hydroxyl value polyether polyols have an SP value of about 14). (For reference, the SP value of water is 23.4, and oil components have an SP value of 8 to 10.)

However, the copolymer (C) contains the structural units from a polyalkylene glycol allyl ether (c1) and the structural units from an unsaturated dicarboxylic acid and/or an acid anhydride thereof (c2), so that the copolymer (C) shows high compatibility with high-SP polar materials such as polyether polyols (E) described later.

Because of the structural units from an aromatic vinyl compound (c3), the copolymer (C) shows high compatibility with non-polar materials such as the low-SP asphalt (A), the viscosity depressant (B) and a polyolefin polyol (D) described later.

If the copolymers (C) are substituted with nonionic low-HLB surfactants such as polyethylene glycol alkyl ethers and polyethylene glycol alkyl esters, the amount of the surfactants should be increased relative to the asphalts (A) in order to achieve the above effects. The use of such surfactants is practically difficult.

Nonionic high-HLB surfactants contain large amounts of hydrophilic groups such as hydroxyl groups or carboxyl groups. If such surfactants are added in large amounts to the asphalts (A) in place of the copolymers (C), they can unfavorably react with a diisocyanate (F) used as a curing agent in the two-component resin composition described later.

⟨Additives⟩

The modified asphalts of the invention may contain additives such as anti-aging agents and flame retardants as required while still achieving the objects of the invention. To control the hardness of the modified asphalts, there may be added petroleum resins, rosin resins, terpene resins, coumarone resins, phenolic resins, aromatic hydrocarbon resins, aliphatic hydrocarbon resins, alicyclic hydrocarbon resins and hydrogenated products of these resins. When the modified asphalts are used as ingredients for railroad track-filling materials, ballasts may be added.

While still achieving the objects of the invention, the modified asphalts may contain additional thermoplastic resins such as ethylene/propylene copolymer, ethylene/vinyl acetate copolymer, ethylene/ethyl acrylate copolymer, styrene/butadiene copolymer, atactic polypropylene and 1,2-polybutadiene.

⟨Production of Modified Asphalts⟩

The modified asphalts of the invention may be produced under conditions appropriately controlled depending on the kinds of the components. For example, when the asphalt (A) is a straight asphalt 40-60, the straight asphalt 40-60 and the viscosity depressant (B) may be mixed together into a homogeneous mixture by controlling the liquid temperature at 70 to 75° C. To achieve this liquid temperature, for example, the liquid temperature of the straight asphalt 40-60 may be adjusted at 80° C. or above, and the liquid temperature of the viscosity depressant (B) may be adjusted at about 60° C. The straight asphalt 40-60 shows fluidity at a liquid temperature of 80° C. or above and permits improved workability.

When an asphalt from a tank truck is directly used as the asphalt (A), the liquid temperature of the asphalt is usually from 150 to 160° C. In this case, it is not necessary to heat the viscosity depressant (B). On the contrary, the viscosity depressant (B) may be added to the asphalt while cooling the depressant.

To avoid alteration of the copolymer (C), the copolymer (C) is preferably mixed with the asphalt (A) and the viscosity depressant (B) at a liquid temperature of not more than 60° C., and more preferably not more than 50° C.

⟨Applications of Modified Asphalts⟩

The modified asphalts of the invention are improved in dispersibility and compatibility with polar materials such as polyfunctional polyether polyols with a high hydroxyl value (OHV) (for example, 200 or more), and show excellent long-term stability. Thus, the modified asphalts may be suitably used as ingredients for railroad track-filling materials.

The modified asphalts can be blended with various polar synthetic resins such as urethane resins and epoxy resins. Thus, the modified asphalts are suitably used as materials for general chemical products with two-component reactive resins such as urethane resins and epoxy resins, with examples of such chemical products including adhesives, coating materials, floor materials and waterproof materials.

[Two-Component Resin Compositions]

The two-component resin compositions of the invention comprise a main component and a curing agent. The main component contains an asphalt (A), a viscosity depressant (B), a copolymer (C), a polyolefin polyol (D) and a polyether polyol (E). The main component may optionally contain an extender pigment (G) and further a synthetic zeolite (H). The curing agent contains a diisocyanate (F).

The two-component resin compositions have the following advantages.

The asphalt (A) is liquefied with the viscosity depressant (B) into a liquid component that is unreactive with the diisocyanate (F). The unreactive liquid component is not completely compatibilized with the polyolefin polyol (D) and the polyether polyol (E) that are liquid components reactive with the diisocyanate (F). When the polyolefin polyol (D) and the polyether polyol (E) in such state are reacted with the diisocyanate (F) and the system is cured, the unreactive liquid component often bleeds or sweats on the surface of cured products over time.

This phenomenon is similar to bleeding or sweating of a plasticizer such as dioctyl phthalate (DOP) added to rigid vinyl chloride. This bleeding or sweating is caused by aging and results in embrittlement of the soft vinyl chloride.

According to the two-component resin compositions of the invention, the specific copolymer (C) functions as a surfactant to permit the asphalt (A) having a small molecular polarity and the polyether polyol (E) having a large molecular polarity to be mixed together homogeneously. Hence, the obtainable cured products have stable quality and low sweating tendency and show stable physical performance over long periods.

⟨Main Component⟩

The main component of the two-component resin composition essentially contains an asphalt (A), a viscosity depressant (B), a copolymer (C), a polyolefin polyol (D) and a polyether polyol (E), and may further contain an extender pigment (G) and a synthetic zeolite (H).

In a preferred embodiment, the main component is obtained by mixing the modified asphalt, a polyolefin polyol (D) and a polyether polyol (E) as essential components, and a viscosity depressant (B), an extender pigment (G) and a synthetic zeolite (H) as optional components. The mixing ratios of these components may be determined appropriately so that the contents of the components will be within the ranges described later. The components may be mixed with, for example, a high-speed dispersion mixer.

⟨Asphalts (A)⟩

The asphalts (A) may be similar to the asphalts (A) used in the modified asphalts.

When the straight asphalt (A1) is used as the asphalt (A), the content thereof in the main component of the two-component resin composition is generally in the range of 5 to 45 wt %, preferably 5 to 25 wt %, and more preferably 10 to 20 wt %. When the content of the straight asphalt (A1) is in this range, the obtainable main component has excellent workability and can give cured products having excellent mechanical strength.

When the blown asphalt (A2) is used as the asphalt (A), the content thereof in the main component is generally in the range of 5 to 40 wt %, preferably 5 to 25 wt %, and more preferably 10 to 20 wt %. When the content of the blown asphalt (A2) is in this range, the obtainable main component has excellent workability and can give cured products having excellent mechanical strength.

⟨Viscosity Depressants (B)⟩

The viscosity depressants (B) are used to prevent increase in viscosity of the main component by the addition in large amounts of inorganic powders such as extender pigments (G) described later, and to prevent cure shrinkage of cured products from the two-component resin compositions.

The viscosity depressants (B) may be similar to the viscosity depressants (B) used in the modified asphalts. In particular, process oils are preferable in terms of cost performance. Paraffin process oils, naphthene process oils and aromatic process oils are commercially available. Of these, aromatic process oils having a low aniline point show a certain level of high compatibility with polar materials and have excellent cost performance.

The content of the viscosity depressants (B) in the main component is generally in the range of 10 to 40 wt %, preferably 20 to 35 wt %, and more preferably 20 to 30 wt %. When the content of the viscosity depressants (B) is in this range, the obtainable main component has appropriate fluidity and excellent workability.

⟨Copolymers (C)⟩

The copolymers (C) may be similar to the copolymers (C) used in the modified asphalts. The copolymers include a structural unit from a polyalkylene glycol allyl ether (c1), a structural unit from an unsaturated dicarboxylic acid and/or an acid anhydride thereof (c2), and a structural unit from an aromatic vinyl compound (c3).

In particular, the two-component resin compositions used as railroad track-filling materials generally do not show water solubility. In view of this, preferred copolymers (C) are copolymers (1) that contain structural units from polypropylene glycol allyl ether, structural units from maleic anhydride and structural units from styrene, and copolymers (2) that contain structural units from polyethylene glycol allyl ether, structural units from maleic anhydride and structural units from styrene. The copolymers (1) are particularly preferred.

Examples of the copolymers (1) include MALIALIM AAB-0851 (product name, manufactured by NOF CORPORATION) Examples of the copolymers (2) include MALIALIM AKM-0531 (product name, manufactured by NOF CORPORATION).

The content of the copolymers (C) in the main component of the two-component resin composition is generally 0.1 to 2 wt %, preferably 0.1 to 1 wt %, and more preferably 0.1 to 0.5 wt %. This content of the copolymers (C) ensures that the dispersibility and compatibility of the asphalts (A) with polar materials are enhanced. Copolymers having constitutions similar to the copolymers (C) are usually expensive and cannot be added in large amounts to asphalts. In contrast, the copolymers (C) in small amounts can modify the asphalts (A) and have superior cost performance.

If the content of the copolymers (C) exceeds the above range, the reaction molar ratio (NCO/OH index) in the crosslinking reaction described later may be outside the predetermined range, and the two-component resin composition may not be cured sufficiently. If the content of the copolymers (C) is below the above range, the dispersibility and compatibility of the asphalts (A) with polar materials may not be improved sufficiently.

⟨Polyolefin Polyols (D)⟩

The polyolefin polyols (D) have excellent compatibility with non-polar materials. The polyolefin polyols are essential components in order to prevent sweating of the asphalts (A) or the viscosity depressants (B) that are nonreactive with a diisocyanate (F), from cured products of the two-component resin compositions.

Examples of the polyolefin polyols (D) include polybutadiene polyol, hydrogenated polybutadiene polyol and polyisoprene polyol. Of these, polybutadiene polyol is preferred.

Commercially available polybutadiene polyols include Poly-bd R45HT (trade name, manufactured by Idemitsu Kosan Co., Ltd., a liquid polybutadiene having a primary or secondary hydroxyl group at terminal and a number average molecular weight of 1200 to 5300), Poly-bd R15HT (manufactured by Idemitsu Kosan Co., Ltd.) KRASOL-LBH 1500, KRASOL-LBH 2000, KRASOL-LBH 2040, KRASOL-LBH 3000, KRASOL-LBH-P3000, KRASOL-LBH-P5000 and KRASOL-HLBH-P3000 (manufactured by Sartomer Company, Inc.).

The polyolefin polyols (D) generally have a hydroxyl value of 20 to 100. With this hydroxyl value, the polyolefin polyols (D) show high compatibility with other components, in particular polyether polyols (E).

The content of the polyolefin polyols (D) in the main component is generally in the range of 5 to 30 wt %, preferably 5 to 20 wt %, and more preferably 5 to 10 wt %. When the content of the polyolefin polyols (D) is in this range, good compatibility with the non-polar materials is obtained.

⟨Polyether Polyols (E)⟩

As described above, the polyolefin polyols (D) show excellent compatibility with the asphalts (A). However, the use of the polyolefin polyols (D) alone as components that react with a diisocyanate (F) to increase the hardness of cured products, results in soft cured products; and the applications of the cured products are limited.

In the invention, polyether polyols (E) are used in the main component together with the polyolefin polyols (D). The polyether polyols (E) react with a diisocyanate (F) and increase the hardness of cured products.

Examples of the polyether polyols (E) include polyether polyols preferably with a hydroxyl value (OHV) of 300 to 600, and more preferably 350 to 450 and with 3 to 4 hydroxyl groups, which polyols are obtained by addition polymerizing propylene oxide and/or ethylene oxide to polyhydric alcohols of three or more hydroxyl groups such as glycerol, trimethylolpropane, diglycerol and pentaerythritol. In particular, polyether polyols preferably with a hydroxyl value (OHV) of 300 to 500, and more preferably 350 to 450 which are obtained by addition polymerizing propylene oxide to trimethylolpropane or pentaerythritol are preferable because of their high reactivity with a diisocyanate (F) and high effects of increasing the hardness of cured products.

Examples of the polyether polyols (E) further include aromatic polyols such as polyols obtained by addition polymerizing propylene oxide and/or ethylene oxide to N,N-bis(2-hydroxyethyl)aniline or N,N-bis(2-hydroxypropyl)aniline.

Commercially available polyether polyols (E) include EXCENOL 400MP, EXCENOL 410NE (manufactured by ASAHI GLASS CO., LTD.), ACTOCOL GR-89 (manufactured by Mitsui Chemical Polyurethanes, Inc.), SANNIX HD402 (manufactured by Sanyo Chemical Industries, Ltd.), DK FLEX (manufactured by DAI-ICHI KOGYO SEIYAKU CO., LTD.), VORANOL 391 (manufactured by Dow Chemical Company) and DESMOPHENE TS-450 (manufactured by Bayer). Of these, EXCENOL 400MP which has a hydroxyl value in the above range is preferable.

The content of the polyether polyols (E) in the main component of the two-component resin composition is generally 3 to 20 wt %, preferably 4 to 15 wt %, and more preferably 5 to 10 wt %. This content of the polyether polyols (E) ensures that the obtainable cured products have appropriate strength.

⟨Extender Pigments (G)⟩

In the two-component resin compositions, extender pigments (G) are preferably used to increase mechanical strength of cured products from the resin compositions, to prevent cure shrinkage, and to reduce costs.

Examples of the extender pigments (G) include powders of calcium carbonate, silicon dioxide, hydrous silicon dioxide, hydrous magnesium dioxide, barium sulfate, barium carbonate, aluminum silicate, calcium silicate, hydrous aluminum silicate, aluminum hydroxide and zinc oxide. These may be used singly, or two or more kinds may be used in combination.

Of the above extender pigments, calcium carbonate powder is particularly preferable because its locality is widely distributed and the hardness is low to permit relatively easy milling (for example, Mohs hardness of calcium carbonate is 3 and that of silicon dioxide is 7), and powder with a small and uniform particle size is obtained inexpensively. It is preferable that calcium carbonate is dry milled into heavy calcium carbonate powder.

The content of the extender pigments (G) in the main component of the two-component resin composition is preferably 1 to 55 wt %, more preferably 30 to 50 wt %, and still more preferably 35 to 45 wt %. This content of the extender pigments (G) ensures that the main component shows appropriate fluidity and excellent workability and that the mechanical strength of cured products is increased.

Since the two-component resin composition of the invention undergoes addition polymerization after the main component and a curing agent are mixed together, cure shrinkage is inevitable. For example, the cure shrinkage of materials such as railroad track-filling materials that are placed into a fixed-volume space in a concrete structure generates residual stress in the cured product to possibly cause (1) cracks in the cured product, (2) separation from the concrete structure and (3) gaps between the cured product and the concrete structure in the space.

According to the present invention, the cure shrinkage of cured products can be suppressed to a level that does not evoke the above problems. For example, the problems are avoided by adding inorganic material powders such as the extender pigments (G) to the main component of the two-component resin composition, or by adding liquid resins such as plasticizers that are nonreactive with diisocyanates (F). The modified asphalts improved in dispersibility and compatibility, and the viscosity depressants (B) also function to suppress the cure shrinkage of cured products.

⟨Synthetic Zeolites (H)⟩

In the two-component resin compositions of the invention, it is often encountered that water finds its way into the composition when the main component and a curing agent are mixed, and the water reacts with a diisocyanate (F) to produce carbon dioxide, causing expansion. By adding a synthetic zeolite (H) to the main component, however, water is removed and the expansion is suppressed or prevented.

Examples of the synthetic zeolites (H) include crystalline alumino silicates of alkali metals or alkaline earth metals represented by $MeO.Al_2O_3.mSiO_2.nH_2O$. Commercially available synthetic zeolites include Molecular sieves 3A, 4A and 5A (manufactured by Union Carbide Corporation).

The synthetic zeolites (H) have a large number of pores therein and effectively adsorb various kinds of molecules such as water, carbon dioxide, ammonia and hydrocarbons. The synthetic zeolites are designed, produced and supplied in several levels of pore sizes so that they can adsorb 3 Å or larger molecules.

Water is one of compounds having the smallest molecular diameter, and synthetic zeolites (H) having a pore size of 3 Å or more can adsorb it. Synthetic zeolites with 4 Å or larger pores are produced in the largest amounts worldwide and are thus most advantageous costwise. Specifically, zeolites with 4 Å pores such as Molecular sieves 4A (manufactured by Union Carbide Corporation) are most preferable.

The content of the synthetic zeolites (H) in the main component of the two-component resin composition is preferably 0.1 to 15 wt %, more preferably 0.5 to 5 wt %, and still more preferably 1 to 5 wt %. This content of the synthetic zeolites (H) ensures that water originating from the extender pigments (G) or the like is removed and the expansion is prevented.

The synthetic zeolites (H) have high water adsorption properties as described above. If the main component is agitated with a dispersion mixer or the like for a long period, the synthetic zeolite will adsorb humid air entrapped by the agitation and can be saturated. Accordingly, it is preferable in the preparation of the main component that the components other than the synthetic zeolite (H) are sufficiently stirred and mixed and the synthetic zeolite (H) is thereafter added.

⟨Additives⟩

The main component of the two-component resin composition may contain a crosslinking catalyst to facilitate the crosslinking reaction of the polyolefin polyols (D) and the polyether polyols (E) with diisocyanates (F). Examples of the crosslinking catalysts include urethane reaction catalysts such as alkylate metal salts and basic compounds, including dibutyltin dilaurate, dioctyltin dilaurate, dioctyltin maleate, lead octylate, triethylenediamine and 1,8-diazabicyclo(5,4,0) undecene-7.

⟨Curing Agents⟩

The curing agent in the two-component resin composition of the invention contains a diisocyanate (F) The diisocyanate (F) is used as a crosslinking agent that crosslinks the polyolefin polyol (D) and the polyether polyol (E).

Examples of the diisocyanates (F) include polymeric MDI (methylene diphenyl diisocyanate), carbodiimide-modified MDI; isocyanate-terminated prepolymers formed between MDI and/or TDI (tolylene diisocyanate) and glycol or polyether glycol; MDI-diluted products of the isocyanate-terminated prepolymers; HDI (hexamethylene diisocyanate) trimers, IPDI (isophorone diisocyanate), NBDI (norbornane diisocyanate); and prepolymers formed between HDI, HDI trimer, IPDI or NBDI, and glycol or polyether glycol. Of these, polymeric MDI is excellent in performance and cost performance and is thus most preferable.

The curing agent containing the diisocyanate (F) is used in an amount such that the equivalent ratio of the isocyanate groups (NCO) in the curing agent to the hydroxyl groups (OH) in the main component (NCO/OH index) is theoretically 1, but the ratio is generally in the range of 0.9 to 1.2, preferably 1.0 to 1.2, and more preferably 1.05 to 1.15. Such amount of the curing agent relative to the main component ensures that the obtainable cured products have stable performance.

[Applications of Two-Component Resin Compositions, and Cured Products]

The two-component resin compositions of the invention are usually composed of the main component and the curing agent. The main component and the curing agent are mixed together by known methods to give cured products.

The two-component resin compositions may be suitably used as elastic synthetic resin materials of on-site placement type which are used in elevated railroad slab tracks and sleeper direct coupling turnout railroad tracks.

The cured products of the two-component resin compositions may be suitably used as railroad track-filling materials. As an example, a concrete structure is provided between an elevated railroad track face and a rail, and the cured product is used to fill the gap between the track face and the concrete structure. The cured products are also used to prevent the concrete structures from being broken by thermal expansion or shrinkage of the rails or by the load such as centrifugal lateral stress from vehicles traversing curved sections.

In detail, the cured products may be used as filling materials around protrusions on track slabs, gap-filling materials to fix synthetic railroad sleepers to turnout roadbeds, gap-filling materials to attach track slabs to roadbeds, repairing materials for freeze-damaged cement asphalt mortar applied as gap-filling materials under track slabs, and buffering materials.

Herein, roadbeds are reinforced concrete roads for railroad tracks that are placed on elevated railroad track faces to change the elevation between the inner and outer rails (a cant) to prevent vehicles from falling by centrifugal force at curved railroad sections, or to place protrusions for immobilizing the track slabs.

EXAMPLES

Hereinbelow, the modified asphalts and the two-component resin compositions according to the present invention will be described in greater detail based on examples without limiting the scope of the invention.

Example 1

A viscosity depressant (B): an aromatic process oil (DI-ANA PROCESS OIL AC-12, manufactured by Idemitsu Kosan Co., Ltd.) (44.25 parts by weight) was placed in a steam-jacketed tank and was heated to approximately 50° C. with stirring by a high-speed dispersion mixer (1000-1500 rpm). Subsequently, an asphalt (A): a straight asphalt 40-60 (55 parts by weight) that had been temperature controlled at 100° C. beforehand was added to the tank. A mixture liquid was thus prepared.

While the mixture liquid was stirred, the liquid temperature that was approximately 75° C. was lowered to approximately 50° C. by circulating cooling water through the steam jacket.

Thereafter, a copolymer (C): MALIALIM AAB-0851 (product name, a copolymer of polypropylene glycol allyl ether, maleic anhydride and styrene, manufactured by NOF CORPORATION) (0.75 part by weight) was added, followed by stirring for approximately 30 minutes. While the stirring was further continued, cooling water was circulated through the steam jacket. When the liquid temperature became about 25° C., the mixture liquid was recovered as a modified straight asphalt from the tank.

Example 2

A modified blown asphalt was obtained in the same manner as in Example 1, except that a blown asphalt 20-30 was used as the asphalt (A) and the amounts of the components were changed as set forth in Table 1.

Comparative Example 1

A liquefied straight asphalt was obtained in the same manner as in Example 1, except that the amounts of the components were changed as set forth in Table 1.

Comparative Example 2

A liquefied blown asphalt was obtained in the same manner as in Example 2, except that the amounts of the components were changed as set forth in Table 1.

[Evaluation of Asphalts]

The modified asphalts (the modified straight asphalt and the modified blown asphalt) from Examples, and the unmodified asphalts (the liquefied straight asphalt and the liquefied blown asphalt) from Comparative Examples, each 165 g, were each mixed with 45 g of a trifunctional polyether polyol (EXCENOL 400MP, manufactured by ASAHI GLASS CO., LTD., hydroxyl value: 400). They were stirred with a testing small high-speed dispersion mixer at room temperature for 30 minutes and were allowed to stand at room temperature for 7 days.

According to the testing method described in "7. Hydroxyl value" in JIS K 0070, the hydroxyl value was measured of the mixture of the modified or unmodified asphalt and the polyether polyol. Table 1 sets forth the results of the modified asphalts from Examples 1-2 and the unmodified asphalts from Comparative Examples 1-2.

The theoretical hydroxyl value of the modified or unmodified asphalt/polyether polyol mixture was 87 mg KOH/g. If the asphalts had improved dispersibility and compatibility with polyether polyols, the actual hydroxyl value would be approximate to the theoretical hydroxyl value. If these properties were not improved, the actual hydroxyl value would be far different from the theoretical hydroxyl value.

For reference, the specific gravity of the modified asphalt from Example 1 was 1.016, and that of the polyether polyol was 1.055. Hence, if the modified asphalt and the polyether polyol were separated, the polyether polyol would be below the asphalt in the mixture, and the actual hydroxyl value would be lower than the theoretical hydroxyl value.

TABLE 1

|  |  | Ex. 1 | Ex. 2 | Comp. Ex. 1 | Comp. Ex. 2 |
|---|---|---|---|---|---|
| Composition (parts by weight) | Straight asphalt 40-60 | 55 | 0 | 55 | 0 |
|  | Blown asphalt 20-30 | 0 | 50 | 0 | 50 |
|  | Viscosity depressant (B)*1 | 44.25 | 49.25 | 45 | 50 |
|  | Copolymer (C)*2 | 0.75 | 0.75 | 0 | 0 |
|  | Total | 100 | 100 | 100 | 100 |
| Performance | Stability (%)*3 of hydroxyl value (OHV) in mixing of polyether polyol | 98 | 96 | 67 | 69 |

*1 Aromatic process oil (aromatic hydrocarbon with weight average molecular weight of 150 to 200).
*2 MALIALIM AAB-0851 (product name, a copolymer of polypropylene glycol allyl ether, maleic anhydride and styrene, manufactured by NOF CORPORATION).
*3 Measured by the method described in "7. Hydroxyl value" in JIS K 0070, "Test methods for acid value, saponification value, ester value, iodine value, hydroxyl value and unsaponifiable matter of chemical products". Hydroxyl value of the mixture containing the modified asphalt from Example or the unmodified asphalt from Comparative Example with polyether polyol is expressed in percentage relative to the theoretical hydroxyl value.

Example 3

A container was sequentially charged with 30 parts by weight of the modified straight asphalt from Example 1, 13 parts by weight of an aromatic process oil as a viscosity depressant (B), 7 parts by weight of a polybutadiene diol (Poly-bd R45HT manufactured by Idemitsu Kosan Co., Ltd., number average molecular weight: 2800, a liquefied polybutadiene terminated with a primary hydroxyl group at both ends (the number of hydroxyl groups: 2)) as a polyolefin polyol (D), 8 parts by weight of a polyoxypropylene ether polyol (EXCENOL 400MP manufactured by ASAHI GLASS CO., LTD., number average molecular weight: 420, the number of hydroxyl groups: 3) as a polyether polyol (E), 40 parts by weight of dry milled heavy calcium carbonate powder (average particle diameter: 2 μm) as an extender pigment (G), and 0.01 part by weight of dibutyltin dilaurate as a crosslinking catalyst. These materials were homogeneously stirred with a high-speed dispersion mixer.

Subsequently, 2 parts by weight of synthetic zeolite powder (pores: 4 Å) as a synthetic zeolite (H) was added to the container. The mixture was homogeneously stirred with a high-speed dispersion mixer to give a composition. The composition was placed in a vacuum defoaming apparatus and was defoamed at a reduced pressure of about 60 mm Hg for approximately 15 minutes, thereby giving a main component composed of a liquid composition.

A two-component resin composition comprised the main component temperature controlled at 23.5° C., and a curing agent which is the polymeric MDI (NCO content: about 31%) as a diisocyanate (F). The main component and the curing agent were mixed in a ratio of 100.01 parts by weight:10 parts by weight (main component:curing agent). Cured products were produced and evaluated by methods described in [Evaluation of cured products] below.

Comparative Example 3, Example 4 and Comparative Example 4

Two-component resin compositions were obtained in the same manner as in Example 3, except that the main component was prepared from the materials in the amounts shown in Table 2. Cured products were prepared and evaluated as described in Example 3.

[Evaluation of Cured Products]

The two-component resin composition was placed in three high-density polyethylene mold containers as illustrated in FIG. 1 and was cured in a thermo-hygrostat at 23.5° C. and 50% RH for 2 days. The products were collected from the mold containers and were further cured in a thermo-hygrostat at 23.5° C. and 50% RH for 2 weeks. The three pieces of cured products as specimens were tested by the following methods.

⟨Hardness⟩

The hardness was determined with a hardness tester in accordance with SRIS-0101, The Society of Rubber Industry, Japan, Standards. Each specimen was tested with respect to three points, and the average of the nine points of the three specimens was obtained.

⟨Young's Modulus⟩

The Young's modulus was obtained by determining the spring constant by a spring constant test in accordance with JIS K 6385 and converting the spring constant to a Young's modulus. The measurement of Young's modulus permitted more quantitative evaluation of the hardness of the cured products. The test result of young' modulus was the mean value of the three specimen's data.

The spring constant was determined in accordance with testing conditions described in the railroad track resin filler specification in the report No. A-87-74 from Railway Technical Research Institute issued in March 1987. In detail, the specimen 100 mm×100 mm×25 mm was compressed three times at a compression rate of 1 mm/min with a maximum compression load of 4.4 kN on the 100 mm×100 mm surface. The spring constant was calculated based on the load-displacement relation from 0.98 kN to 3.92 kN in the third compression curve.

⟨Sweating Tendency⟩

The cured products were stored in a thermo-hygrostat at 23.5° C. and 50% RH for 3 months, and the sweating tendency was evaluated by visually inspecting for the bleeding of the asphalt and the process oil from the cured product.

Table 2 sets forth the chemical compositions of the two-component resin compositions obtained in Examples 3-4 and Comparative Examples 3-4, and the evaluation results of the cured products. The results in Table 2 clearly show that the cured products of the two-component resin compositions from Examples 3 and 4 had increased storage stability and mechanical strength.

TABLE 2

|  |  | Ex. 3 | Ex. 4 | Comp. Ex. 3 | Comp. Ex. 4 |
|---|---|---|---|---|---|
| Composition (parts by weight) | Modified straight asphalt from Example 1 | 30 | 0 | 0 | 0 |
|  | Modified blown asphalt from Example 2 | 0 | 30 | 0 | 0 |
|  | Liquefied straight asphalt from Comparative Example 1 | 0 | 0 | 30 | 0 |
|  | Liquefied blown asphalt from Comparative Example 2 | 0 | 0 | 0 | 30 |
|  | Viscosity depressant (B) | 13 | 13 | 13 | 13 |
|  | Polyolefin polyol (D) | 7 | 7 | 7 | 7 |
|  | Polyether polyol (E) | 8 | 8 | 8 | 8 |
|  | Extender pigment (G) | 40 | 40 | 40 | 40 |
|  | Synthetic zeolite (H) | 2 | 2 | 2 | 2 |
|  | Crosslinking catalyst | 0.01 | 0.01 | 0.01 | 0.01 |
|  | Diisocyanate (F) | 10 | 10 | 10 | 10 |
|  | Total | 110.01 | 110.01 | 110.01 | 110.01 |
| Evaluations of cured products | Hardness (SRIS-0101, The Society of Rubber Industry, Japan, Standards) | 91 | 88 | 73 | 75 |
|  | Young's modulus (compression, MPa) | 35 | 27 | 11 | 12 |
|  | Sweating tendency (visual inspection) | None | None | Heavy sweating | Heavy sweating |

The two-component resin compositions used in Examples 3 and 4 contained the modified asphalt with improved dispersibility and compatibility. The cured products thereof showed a Young's modulus two times or more as high as that of the cured products of the two-component resin compositions of Comparative Examples 3 and 4 that contained the unmodified asphalt. Since the cured products are usually used under compressive environment such as the railway track, the improvement in hardness provides a significant advantage.

When the two-component resin compositions of Comparative Examples 3 and 4 that contained the unmodified asphalt were cured, some of the asphalt and the process oil (which were distributed in the composition) did not remain in the cured product by the reason that the unmodified asphalt had not (adequate) dispersibility and compatibility to the polar resin. As a result, the asphalt and the process oil bled out on the surface of the cured product to cause heavy sweating.

The two-component resin compositions of Examples 3 and 4 contained the modified asphalt improved in dispersibility and compatibility. In contrast to the above results, the cured products of these compositions did not show any sweating as a result of the drastic improvement in compatibility of the asphalt (A) with the polyether polyol (E).

The invention claimed is:

1. A modified asphalt comprising:
an asphalt (A),
a viscosity depressant (B) and
a copolymer (C)
    said copolymer (C) comprising:
    a structural unit from a polyalkylene glycol allyl ether (c1),
    at least one selected from the group consisting of a structural unit from an unsaturated dicarboxylic acid and/ an acid anhydride thereof (c2), and
    a structural unit from an aromatic vinyl compound (c3).
2. The modified asphalt according to claim 1, wherein the asphalt (A) is a straight asphalt (A1) according to JIS K 2207.
3. The modified asphalt according to claim 1, wherein the asphalt (A) is a blown asphalt (A2) according to JIS K 2207.
4. The modified asphalt according to any one of claims 1 to 3, wherein the viscosity depressant (B) is a process oil.
5. A two-component resin composition comprising a main component and a curing agent,
the main component comprising:
    an asphalt (A),
    a viscosity depressant (B),
    a copolymer (C) comprising:
    a structural unit from a polyalkylene glycol allyl ether (c1),
    at least one selected from the group consisting of a structural unit from an unsaturated dicarboxylic acid and an acid anhydride thereof (c2) and
    a structural unit from an aromatic vinyl compound (c3),
    a polyolefin polyol (D) and
    a polyether polyol (E),
the curing agent comprising a diisocyanate (F).
6. The two-component resin composition according to claim 5, wherein the asphalt (A) is a straight asphalt (A1) according to JIS K 2207.
7. The two-component resin composition according to claim 5, wherein the asphalt (A) is a blown asphalt (A2) according to JIS K 2207.
8. The two-component resin composition according to any one of claims 5 to 7, wherein the viscosity depressant (B) is a process oil.
9. The two-component resin composition according to any one of claims 5 to 7, wherein the main component further comprises an extender pigment (G).
10. The two-component resin composition according to claim 8, wherein the main component further comprises an extender pigment (G).
11. The two-component resin composition according to claim 9, wherein the main component further comprises a synthetic zeolite (H).
12. The two-component resin composition according to claim 10, wherein the main component further comprises a synthetic zeolite (H).
13. The two-component resin composition according to any one of claims 5 to 7, which is a railroad track-filling material.
14. The two-component resin composition according to claim 8, which is a railroad track-filling material.
15. The two-component resin composition according to claim 9, which is a railroad track-filling material.
16. The two-component resin composition according to claim 10, which is a railroad track-filling material.

* * * * *